PREPARATION OF PROPIONAMIDE ETHERS OF STARCH

Eugene F. Paschall, Orland Park, Ill., assignor to Corn Products Company, a corporation of Delaware
No Drawing. Filed Jan. 29, 1958, Ser. No. 711,769
5 Claims. (Cl. 260—233.3)

This invention relates to the preparation of starch ethers by reacting acrylamide with the hydroxyl groups of starch.

An object of this invention is to prepare substantially pure propionamide or mixed propionamide-carboxyethyl starch ethers in granule form. A further object is to prepare propionamide starch ethers containing substantially no carboxyethyl groups. A further object is to prepare starch ethers which form pastes which retain their viscosity in the presence of salts. Yet another object is to prepare the aforementioned products in aqueous media. Other objects will appear hereinafter.

I have discovered that starch in granule form in aqueous slurry may be treated with acrylamide in contact with a critical amount of alkaline catalyst to form either substantially pure propionamide ether or mixed propionamide-carboxyethyl ethers in which the original granule structure of starch is substantially unchanged. The presence of carboxyethyl groups imparts a negative charge to the products making them anionic. The reaction proceeds at room temperature but the rate of reaction may be increased by heating the reaction mixture.

The following equations are believed to illustrate the reaction which takes place during the process of my invention:

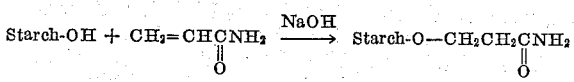

Part of the propionamide groups in such a derivative may be hydrolyzed under certain conditions to carboxyethyl groups resulting in a mixed starch ether derivative. The following equation will illustrate this:

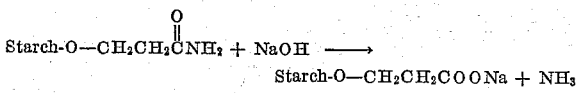

It is not practical, however, to prepare mixed derivatives this way since the cost of acrylamide is greater than other available carboxyethylating agents. Furthermore, a substantially pure propionamide starch ether has more attractive properties for most uses than the mixed ether and, as already mentioned, it is one of the objects of the present invention to provide a method whereby a substantially pure propionamide starch ether or one with a low carboxyethyl content may be prepared.

I have discovered a means to accomplish this based on the use of critical amounts of alkaline catalyst. I have also discovered that, where high D.S. products are desired, the use of salts, such as sodium sulfate and sodium chloride, prevents hydrolysis of the acrylamide groups to carboxyethyl so that a substantially pure B-propionamide ether of granular starch is obtained; the presence of such salts also prevents swelling and gelatinization of the starch granule and increases the etherification efficiency. The discovery that certain salts prevent hydrolysis of the acrylamide groups was unexpected and is in part responsible for the success of my invention.

Whether a substantially pure propionamide starch ether or a mixed propionamide-carboxyethyl starch ether is obtained depends upon proper choice of reaction ingredients, amounts thereof, time and temperature. By substantially pure propionamide starch ether, I mean to include those products having a carboxyethyl group content no greater than one per 60–70 anhydroglucose units in starch, a degree of substitution (D.S.) of about 0.015 carboxyethyl or less. The mixed ethers should not have a carboxyethyl content exceeding the propionamide content.

For example, when 5.7 g. (0.08 mole) of acrylamide, 2 g. (0.05 mole) of NaOH, 162 g., dry basis (one mole) of corn starch are slurried into 250 ml. of water, and the mixture heated at 45° C. for 18 hours, a substantially pure propionamide starch ether is obtained. If any or all of the following variables, i.e., time, temperature, concentration of alkali, and concentration of acrylamide is increased substantially, the mixed ether is obtained. In general, the amount of alkaline catalyst tolerated for preparation of propionamide ethers of starch or mixed propionamide ethers in granule form is a function of D.S. For products below 0.1 D.S. more alkali can be tolerated than above 0.1 D.S. since substitution of propionamide and/or carboxyethyl groups increases the ease with which starch gelatinizes in the presence of alkali. When an alkaline catalyst alone is used, i.e., no salt is added, and the D.S. of the desired product is below 0.1, the amount of catalyst should not exceed the equivalent of 0.1 mole of sodium hydroxide per mole of starch and the temperature should not exceed about 50° C. Higher concentrations of alkali cause the granules to swell to the point where washing with water is impractical because the product cannot be filtered readily. In the absence of a gelatinization inhibitor, it is exceedingly difficult to prepare propionamide ethers of starch in granule form at D.S. levels above about 0.1.

If a salt such as NaCl, $Na_2SO_4$, $K_2SO_4$, $Na_2CO_3$ is added to prevent gelatinization of starch and hydrolysis of the acrylamide group, then the amount of alkaline catalyst may be increased to about 0.15 mole per mole of starch (about 4.0 percent by weight of the starch) for preparation of granular propionamide ethers ranging up to about 0.4 D.S. However, I prefer to use about 0.06 mole of catalyst per mole of starch for propionamide ethers above about 0.15 D.S. Any amount of salt may be used although there is no advantage in using amounts in excess of that required to saturate the reaction mixture. The amount of salt required to prevent starch granule swelling and hydrolysis of propionamide groups depends on the D.S. of the product and amount of alkali catalyst and the reaction temperature. The efficiency of the etherification is increased when such salts are present and is proportional to the concentration of the salt up to a salt-saturated reaction medium. Allowable values of all the effective variables tend to increase (although not necessarily all at the same time) when salts are used up to amounts required to saturate the solution. For example, the temperature may be as high as 70° C., but then the concentration of strongly alkaline catalyst should be not more than about 0.08 mole per molar weight of anhydroglucose residue, when the concentration of acrylamide is 0.8 mole per molar weight of anhydroglucose residue, and the time is 16 hours.

My invention is applicable to all starches, e.g., corn, potato, grain sorghum, tapioca, sago, rice, wheat, waxy maize and other known varieties, both in untreated and modified states. Among the modified starches may be mentioned thin boiling, oxidized, dextrinized or previously derivatized starches which still contain hydroxyl groups.

The starch ethers prepared in accordance with my invention are unique. It is well known to those skilled in the art that gelatinized sols of charged starch derivatives known in the past, either positive or negative, are sensitive toward salts. For example, a solution of carboxymethyl starch or quaternary ammonium starch ether undergoes a reduction in viscosity in the presence of either NaCl or $Na_2SO_4$. This salt sensitivity is particularly objectionable for certain uses requiring highly viscous, stable starch sols containing salts. A high viscosity, clear, and stable starch sol which will tolerate salts is desired in textile printing gums. Similar characteristics are desirable in starches used as oil well drilling mud adjuncts and in fire proofing preparations for fabrics consisting of starch and ammonium sulfate and the like.

I have made the discovery that gelatinized pastes of propionamide starch ethers substantially free of carboxyethyl groups are unusually stable in the presence of salts. Furthermore, I have found that a product which has a carboxyethyl D.S. of about 0.025 and a propionamide D.S. of 0.025 has both the aforementioned desirable viscosity and clarity characteristics even in the presence of substantial amounts of a variety of salts.

The following examples will further illustrate the invention and are to be considered for such purposes only and not in any sense limiting the invention.

*Example 1*

Fifty grams of NaCl, 5.7 g. (0.08 mole) of acrylamide and 2 g. (0.05 mole) of NaOH were added to 250 ml. of water. One hundred and sixty-two grams (dry basis) of unmodified corn starch was slurried in this solution. The reaction mixture was stirred for 18 hours at 50° C. The starch product was neutralized with HCl, filtered and washed with water. The product was an essentially pure propionamide starch ether with a propionamide D.S. of 0.039 and a carboxyethyl D.S. of less than 0.01. The clarity of paste was 47 percent (expressed as percent light transmission of a 1 percent paste at $\lambda=650$ m$\mu$, using a Coleman spectrophotometer). The Brookfield viscosity at 26° C. of a 3 percent paste was 1960 centipoises. The addition of 5 percent by weight of sodium chloride only lowered the viscosity to 1840 centipoises.

*Example 2*

Fifty grams of NaCl, 5.7 g. (0.08 mole) of acrylamide and 6 g. (0.15 mole) of NaOH were added to 250 ml. of water. One hundred and sixty-two grams (dry basis) of unmodified corn starch was slurried in this solution. The reaction mixture was stirred for 18 hours at 50° C. The starch product was neutralized with HCl, filtered and washed with water until salt free. The product was a mixed propionamide carboxyethyl starch ether. The propionamide D.S. was 0.039 and the carboxyethyl D.S. was 0.022. A paste made from the product was found to flocculate cationic colloids. The clarity of a 1 percent paste was 71 percent. The mixed starch ether had a Scott viscosity of 70 seconds per 50 ml. of paste using 7 g. starch in 280 ml. of water. The paste clarity and viscosity of the product are both considerably higher than for unmodified corn starch.

*Example 3*

Fifty grams of Na$_2$SO$_4$, 4.3 g. (0.06 mole) of acrylamide and 4 g. (0.1 mole) of NaOH were added to 275 ml. of water. One hundred and sixty-two grams (dry basis) of unmodified corn starch was slurried in this solution. The reaction mixture was stirred for 20 hours at 50° C. The starch product was neutralized with HCl, filtered and washed with water. The product had a propionamide D.S. of 0.031 and a carboxyethyl D.S. of 0.017. The mixed ether had a 7 g. Scott viscosity of 150 seconds, and a paste clarity of 64 percent, determined as in Example 1.

*Example 4*

The procedure in Example 3 was repeated except that only 25 g. of Na$_2$SO$_4$ were used. The lower salt concentration in the experiment yielded a propionamide D.S. of 0.025 and a carboxyethyl D.S. of 0.018. The product had a paste clarity of 76 percent, determined as in Example 1, and a 7 g. Scott viscosity of 79 seconds.

*Example 5*

One hundred and sixty-two grams (dry basis) of grain sorghum starch was substituted for the unmodified corn starch in a procedure similar to Example 1. The product had a propionamide D.S. of 0.040, and a paste clarity of 56 percent, determined as in Example 1.

*Example 6*

One hundred and sixty-two grams (dry basis) of wheat starch was substituted for the unmodified corn starch in a procedure similar to Example 1. The product had a propionamide D.S. of 0.035, and a clarity of 50 percent, determined as in Example 1.

*Example 7*

One hundred and sixty-two grams (dry basis) of waxy grain sorghum starch was substituted for the corn starch in a procedure similar to Example 1. The product had a propionamide D.S. of 0.046, and a paste clarity of 63 percent, determined as in Example 1.

*Example 8*

One hundred and sixty-two grams (dry basis) of 40 fluidity acid modified corn starch was employed in a procedure similar to Example 1. The product had a propionamide D.S. of 0.040. The fluidity increased to 57 after the derivatization.

*Example 9*

A propionamide starch prepared in accordance with Example 1 having a fluidity of 75 and an amide D.S. of 0.031 was made into a free film. An aqueous slurry containing 10 percent of the starch ether was heated to 195° F. and the dispersion kept at this temperature for 30 minutes. Then the dispersion was cooled to 160° F. and cast on nickel-chrome plates, using a Bradley blade giving a wet thickness of 1.5 mils. The plates had been cleaned with detergent and xylene, dried in an oven, and allowed to cool to room temperature before use. After the film was cast, the plates were placed in a constant condition room (temperature 70–72° F., R.H. 60–70 percent) for 3 hours, after which the film was removed. The resultant film was clear, flexible and strong.

*Example 10*

The procedure of the above example was repeated except 0.167 mole of acrylamide was employed and the product was washed with water instead of methanol. The propionamide D.S. was 0.1 and the carboxyethyl D.S. was 0.007.

*Example 11*

This example illustrates the preparation of a 0.4 D.S. starch propionamide ether in which sufficient Na$_2$SO$_4$ is present to prevent starch gelatinization during etherification.

One mole of raw corn starch, 180 grams at 12 percent moisture, was slurried in 200 ml. of water containing 0.56 mole (80 grams) of Na$_2$SO$_4$. Then, 0.06 mole NaOH in 50 ml. of water was added to the slurry while agitating vigorously. The alkaline slurry was transferred to a reaction flask immersed in a 50° C. constant temperature bath. Acrylamide, 0.833 mole (59.2 grams), was then added and the slurry stirred 17 hours at 50° C.

The slurry was neutralized to pH 7.0 with 0.032 mole HCl. The product filtered rapidly showing that detrimental starch granule swelling did not occur during the reaction. The filter cake was washed first with 500 ml. of methanol then with two 500 ml. portions of 50 percent aqueous methanol. The product was cold water swelling. The product had a D.S. of 0.4 with respect to propionamide groups and only 0.01 D.S. with respect to carboxyethyl groups.

Example 12

The procedure of Example 11 was repeated except 0.67 mole of acrylamide and 0.1 mole of NaOH was employed. The propionamide D.S. was 0.36 and the carboxyethyl D.S. was 0.027.

Example 13

This example illustrates the preparation of a low D.S. starch propionamide using $Ca(OH)_2$ as the etherifying catalyst.

One mole of raw corn starch, 180 grams at 12 percent moisture, was slurried in 180 ml. of water. Then 0.05 mole of $Ca(OH)_2$ (equivalent to 0.1 mole NaOH) in 70 ml. of water and 0.10 mole of acrylamide were added to the slurry. The slurry was stirred for 7.5 hours at 50° C. The slurry was neutralized from pH 11.7 to pH 7.0 with 0.080 mole 2 N HCl, then filtered. Filter time was 7 minutes 52 seconds. The filter cake was washed with 200 ml. distilled water in 8 minutes 42 seconds. Detrimental swelling of the starch derivative did not occur during washing. The propionamide D.S. of the product was 0.038 and the carboxyethyl D.S. was only 0.0051.

This application is a continuation-in-part of application Serial No. 493,063, filed March 8, 1955, now abandoned.

I claim:

1. A process for preparing propionamide and mixed propionamide-carboxyethyl ethers of starch in granule form, such mixed ethers having a carboxyethyl content not exceeding the propionamide content, which comprises reacting starch in granule form in an aqueous slurry with acrylamide in contact with an effective amount of an alkaline catalyst, the reaction being carried out under non-gelatinizing conditions; the amount of catalyst not exceeding the equivalent of 0.1 mole of sodium hydroxide per mole of starch.

2. A process for preparing propionamide ethers of starch in granule form, the carboxyethyl content of said propionamide ethers not exceeding a D.S. of 0.015, which comprises reacting starch in granule form in an aqueous slurry with acrylamide in contact with an effective amount of an alkaline catalyst and a water soluble salt which both inhibits starch gelatinization and hydrolysis of the propionamide group, the reaction being carried out under non-gelatinizing conditions; the amount of catalyst not exceeding 0.15 mole per mole of starch for products having a D.S. not exceeding about 0.4.

3. Process according to claim 2 wherein the water soluble salt is sodium sulfate.

4. A process for preparing propionamide and mixed propionamide-carboxyethyl ethers of starch in granule form, such mixed ethers having a low carboxyethyl content which comprises reacting starch in granule form in an aqueous slurry with acrylamide in contact with an effective amount of a strongly alkaline hydroxide catalyst, the reaction being carried out under non-gelatinizing conditions and the amount of catalyst not exceeding about 4.0% by weight of the starch.

5. A process for preparing propionamide and mixed propionamide-carboxyethyl ethers of starch in granule form, such mixed ethers having a low carboxyethyl content, which comprises reacting starch in granule form in an aqueous slurry with acrylamide in contact with sodium chloride and a catalytically effective amount of sodium hydroxide, the reaction being carried out under non-gelatinizing conditions and the amount of catalyst not exceeding about 4.0% by weight of the starch.

References Cited in the file of this patent

UNITED STATES PATENTS

| | | |
|---|---|---|
| 2,338,681 | Bock et al. | Jan. 4, 1944 |
| 2,618,633 | Vaughan | Nov. 18, 1952 |
| 2,626,257 | Caldwell et al. | Jan. 20, 1953 |